Figure 1:
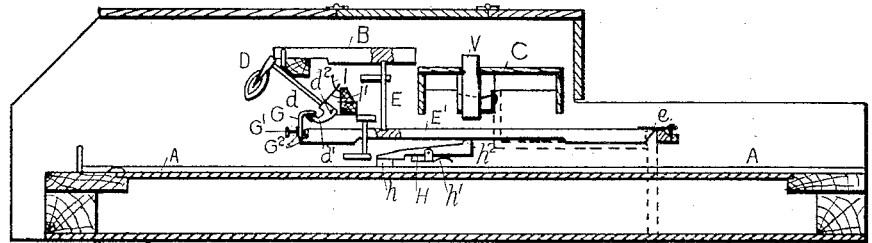

(No Model.) 3 Sheets—Sheet 1.

J. STRONG.
PIANOFORTE OR PIANETTE.

No. 578,782. Patented Mar. 16, 1897.

Witnesses
H. van Oldenneel
Otto Munk

Inventor
Joseph Strong
by Richardson
Attorneys (No Model.) 3 Sheets—Sheet 2.
J. STRONG.
PIANOFORTE OR PIANETTE.
No. 578,782. Patented Mar. 16, 1897.
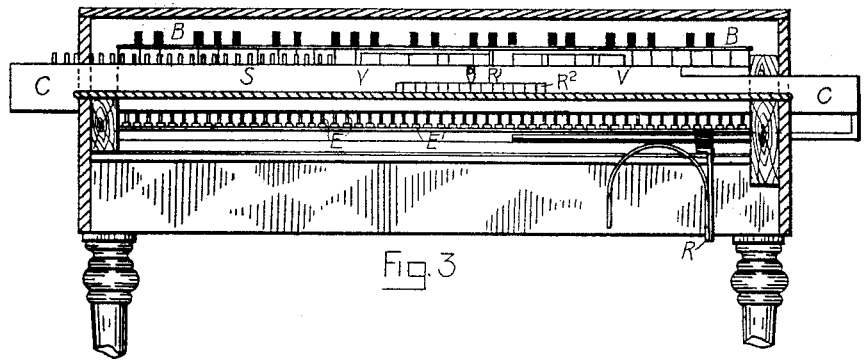
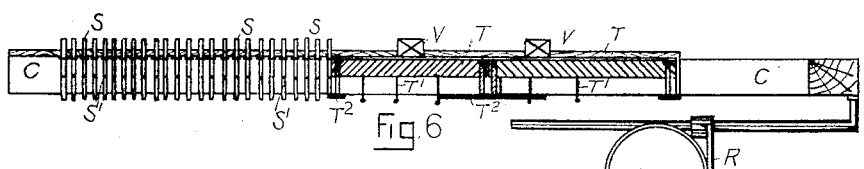
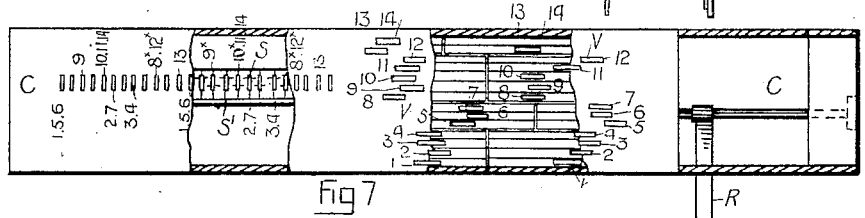
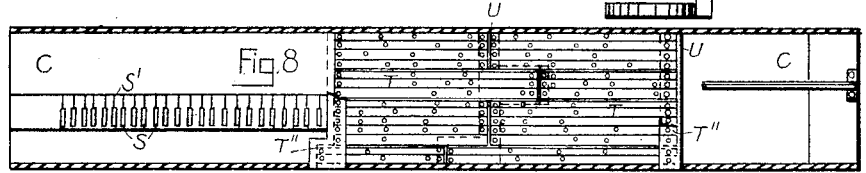
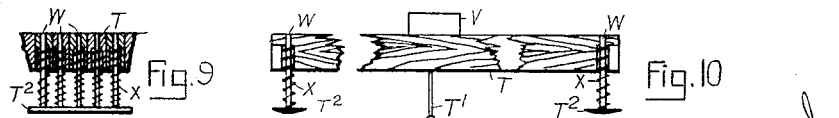
Witnesses
H. van Oldenneel
Otto Munk
Inventor
Joseph Strong
by Richardson
Attorneys (No Model.) 3 Sheets—Sheet 3.
J. STRONG.
PIANOFORTE OR PIANETTE.

No. 578,782. Patented Mar. 16, 1897.

UNITED STATES PATENT OFFICE.

JOSEPH STRONG, OF LISMORE, NEW SOUTH WALES.

PIANOFORTE OR PIANETTE.

SPECIFICATION forming part of Letters Patent No. 578,782, dated March 16, 1897.

Application filed January 31, 1896. Serial No. 577,601. (No model.)

*To all whom it may concern:*

Be it known that I, JOSEPH STRONG, a subject of the Queen of Great Britain, and a resident of Lismore, in the Colony of New South Wales, have invented certain new and useful Improvements in Pianofortes and Pianettes, of which the following is a specification.

The attachment is a key-compounding mechanism. The keys on the keyboard of the piano or pianette or parts connected therewith are acted on by strikers or fingers on the compounding-bars in the attachment, which bars are each operated by a single key. The strikers or fingers on the compounding-bars are placed in such positions that the depression of the bars will cause them to operate such of the keys of the instrument as will produce a "chord." Thus when the finger-keys of the compounding-bars of the attachment are struck the corresponding chord is sounded just as if all the keys on the keyboard of the instrument had been struck in the ordinary way. There is a compounding-bar provided for the treble of every chord, and the finger-keys of these bars are marked to indicate their values and to show which of them correspond. Thus the keys of the group connected with the middle octave (treble) are numbered from "1" to "7," and there is a plate beside them inscribed "Major chords" or words or letters to that effect. Other groups are similarly indicated, and for greater clearness the keys controlling chords of the minor are indicated by red coloring or figuring, while those of the major are indicated by black coloring or figuring. A similar system of coloring or figuring is in use for the bass, where simply keys and not compounding-bars are preferably used. The finger-keys referring to all major chords are marked "1" to "7;" those referring to the minor, "8" to "12," and those referring to modulating chords "13" and "14."

The attachment is adapted to be placed over the keys or connected parts of a piano or pianette, whose ordinary construction must be somewhat altered to allow of this being done. This alteration involves the doing away with the common keyboard and the substitution for it of a keyboard all the keys of which are of equal width and on the same level. The attachment is so set up that it can be moved along the keyboard just as a type-writer carriage can be moved on its bed. By such a movement it can be set to any key in a moment, with which end in view it is provided with a pointer which moves across an indicator-plate on the piano-frame, on which plate the names of the tonic notes corresponding to the several positions of the attachment are inscribed.

The strikers on the compounding-bars are spaced so that they will strike keys separated by the proper intervals. As the chords of any key are severally produced by striking keys the intervals between which are alike for corresponding chords the positions of these strikers will be always correct whatever key the attachment may be placed for. Thus the first major chord will consist of sounds between which there are fixed intervals irrespective of the key, and so on through the seven major, five minor, and two modulating chords which the attachment is adapted to produce. To produce the first major chord of the key to which the attachment is set, the finger-key marked "1" (in black) of the group bracketed as "major" is struck with a finger of the right hand, while one of or the two finger-keys in the bass marked "1" (in black) and separated by the distance of a complete octave are struck with the left hand. Any other of the thirteen remaining chords are struck in the same manner. In the treble the series of chords is duplicated in the upper octave, whereby the player is given opportunity to play the chord in the two octaves or to choose either octave at will.

Figure 2:
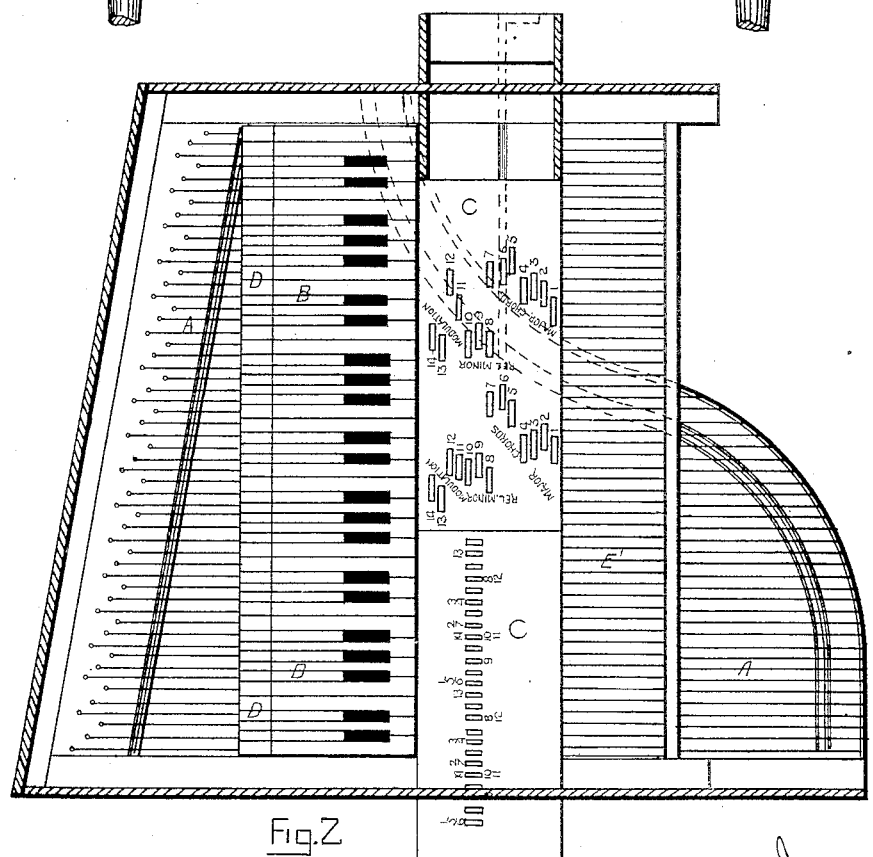
Figure 4:
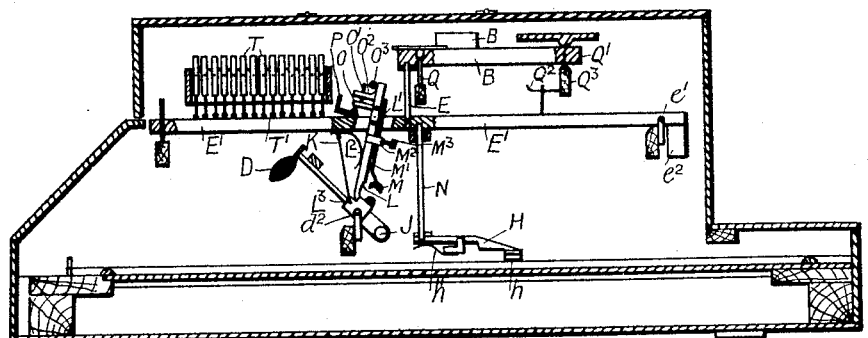
Figure 5:
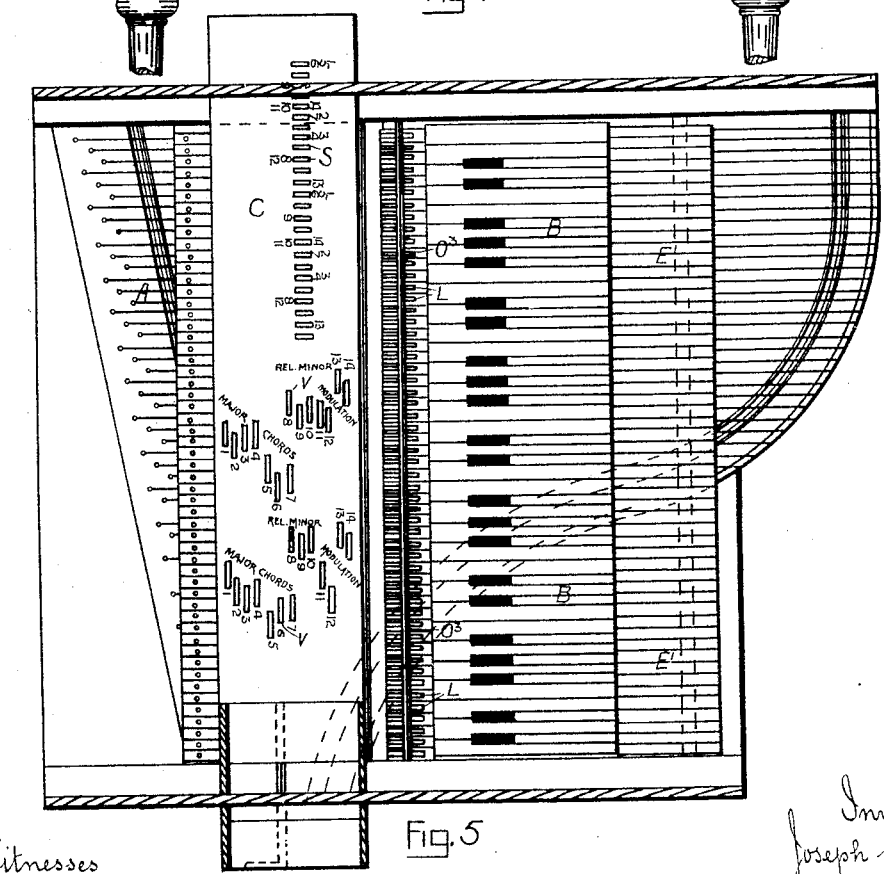

Referring to the annexed sheets of drawings, Figure 1 is a section through a piano to which my invention is applied; Fig. 2, a plan of same, the top of the case being removed; Fig. 3, a front view thereof; Fig. 4, a section through another piano having a different action and also having the compounding attachment connected with it; Fig. 5, a plan of the arrangement sectioned in Fig. 4; Fig. 6, longitudinal section illustrative of the construction of the key-compounding attachment; Fig. 7, a top plan of same; Fig. 8, a bottom plan of same; Figs. 9 and 10, detail of compounding-bars.

Referring to Fig. 1, A is the piano-wire; B, one of the ordinary keys; C, the compounding attachment; D, the hammer; $d$, the hammer-butt; $d'$, a toe-piece thereon faced with felt; $d^2$, the center-pin of the hammer; E, the sticker, connected flexibly at its ends to the key B and to the intermediate bars E', which are supported and sustained in normal position by a spring-carrier $e$. On the outer end of the bar E' a beak or claw G is mounted. It is set on a screwed pin G', on which are two nuts G², which bite it and keep it in place, so that it may be adjusted to fit the toe of the hammer. H is a damper whose pad $h$ lies normally in contact with the wire A, in which position it is kept by the spring $h'$, its outer end $h^2$ being in contact with the bar E'. I is a spring for tripping back the hammer, to which it is connected by a wire loop I'. When the key B is depressed, it acts through the sticker on the intermediate bar E', which it depresses, thereby bringing down the hammer and raising the damper at the same moment as in ordinary piano-actions. The compounding attachment acts on the bars E' just as the keys do.

Referring to Figs. 4 and 5, illustrative of the alternative action, similar letters of reference refer to like parts. The hammer is provided with a counterbalanced butt J, and the forward part of the butt is connected by a flexible stirrup K to the intermediate bar E', which is mounted on a pin $e'$ and counterbalanced by a weight $e^2$. The hopper L is pivoted at L' to the bar E', and a light spring L² thereon acts upon it, tending to push it backward. Its point works in the notch L³ in the butt J. M is a check-buffer whose shank M' works in a carrier M² on the hopper, there being a set-screw M³ to bite it. The damper is operated by connections almost identical with those described in the previous arrangement. The intermediate bar E' is connected to the power end of the damper-lever through a sticker N. Near the top end of the hopper a wiper-arm or escapement O is set pivotally at $o$ upon it. This wiper is acted upon by a setting-screw O', which works through a bracket O² on the hopper. O³ is a stop or check to prevent the hopper overrunning. The wiper-arm O slides on the edge of the escapement-rail P, its contact with which causes the toe of the hopper to move toward the hammer-head. The point at which the escapement action commences is determined by the setting of the screw O'. Q is the key-center pin, and Q' the key-balance pin. Q² is a light spring on the key-rail Q³, and Q⁴ is a connection joining the spring Q² and the intermediate bar E'. The bars E' are of equal width and spacing. One of them is provided for every key. Briefly described, the action of this mechanism is as follows: The movement of the key B is imparted to the intermediate bar E' by the sticker E, and as this bar E' moves down it raises the damper H through the sticker N, and it forces down the hopper L, which, engaging at its lower end with the hammer, throws the same down to strike the string and is released therefrom by the wiper O coming in contact with the escapement-rail P and swinging the hopper on its pivot, and as the hammer completes its movement its rear part strikes the check-buffer M.

It will be seen on reference to the drawings that the compounding attachment C is placed between the keys B and the outer or guided end of the intermediate bar E' and that it need not be removed to allow a performer to manipulate the keys B, which he may do independently of the attachment or to procure additional effects. The working surfaces of the parts in the action are shod with felt or other substance ordinarily used by pianomakers for this purpose. Either of the actions may be fitted with pedal mechanism of any suitable well-known construction.

Fig. 3 illustrates the front view of a pianette having my compounding attachment fitted to it, and Figs. 6 to 10 details of the attachment.

R is a knee-clip fastened to the attachment, by means of which it can be moved along the keyboard readily, so as to transpose from one key to another without necessitating the removal of the operator's hands from the keyboard. R' is the pointer and R² the indicator-plate, by means of which the key to which the attachment is set is indicated.

The left-hand or "bass" end of the attachment need not be provided with compounding mechanism, which is necessary only in the "treble," but, if desired, the bass may be similarly compounded. It is preferred to compound the bass when the compass of the compounding attachment is made to exceed, say, four and a half octaves. The frame of the attachment is oblong and consists of a boxlike structure open at the bottom side and having in it guides and carriers for the simple and compound strikers, the former of which are in the bass and the latter in the treble. The simple strikers S are single studs, one to each key, set in vertical slides and having light springs S' to maintain them in the normal position, as shown in Fig. 6. Upon any one of these strikers being depressed by the operator it moves the corresponding intermediate bar E' below it and so throws the action into motion. Upon the pressure of the finger being withdrawn the striker resumes its normal position. The compound strikers consist of bars T, moving in guides U, and provided with button-headed pins T' to make contact with the intermediate bars E', which require to be moved to strike the chord to which the striker corresponds. There is provided also a finger contact-piece V on the top side of each of the strikers. These pieces pass through slots in the top plate of the attachment. The bars T move on guide-pins W, which pass through holes bored in them. They are supported in their normal positions by light spiral springs X, which are fixed about the guides W.

To produce the first major chord of the key to which the attachment is set, the strikers in the bass to which the number "1" is affixed are depressed, as a piano-key, with fingers of the left hand, and either or both keys similarly marked in the major groups in the treble are struck with a finger or fingers of the right hand. Any other of the fourteen chords is produced by selecting strikers similarly marked and striking them with fingers of the right hand.

The "action" illustrated in Fig. 1 has been devised to adapt a pianoforte or pianette to be operated by an attachment of the nature described placed between the ordinary keyboard and the fulcra of the intermediate bars, while the action in Fig. 4 has been designed for use when the ordinary keyboard is between the attachment and the said fulcra.

Having now particularly described and ascertained the nature of my said invention and in what manner the same is to be performed, I declare that what I claim is—

1. In combination, the hammer, the ordinary keys, the intermediate bars E' with connections to the hammers, and the compounding mechanism, both the ordinary keys and the compounding mechanism being arranged over the intermediate bars E' and at different points along the same to act thereon independently, substantially as described.

2. In combination, the hammers, the keys, the compounding mechanism, the intermediate bars E', a hopper pivoted to the intermediate bar and engaging the hammers, an adjustable escapement comprising a rail and a piece on the hopper to contact therewith and the adjustable check-buffer M on the hopper, both the keys and the compounding mechanism being arranged at different points over the bars E', substantially as described.

In witness whereof I have hereunto set my hand in the presence of two witnesses.

JOSEPH STRONG.

Witnesses:
W. I. SPRUSON,
W. I. DAVIS.